United States Patent
Schill

(10) Patent No.: US 9,041,251 B2
(45) Date of Patent: May 26, 2015

(54) BOOST CONVERTER WITH MULTIPLE INPUTS AND INVERTER CIRCUIT

(75) Inventor: Christoph Schill, Ravensburg (DE)

(73) Assignee: Platinum GmbH, Wangen (DE)

( * ) Notice: Subject to any disclaimer, the term of this patent is extended or adjusted under 35 U.S.C. 154(b) by 790 days.

(21) Appl. No.: 13/290,210

(22) Filed: Nov. 7, 2011

(65) Prior Publication Data

US 2012/0112550 A1    May 10, 2012

(30) Foreign Application Priority Data

Nov. 5, 2010 (DE) .......................... 10 2010 050 624
Feb. 16, 2011 (DE) .......................... 10 2011 011 329

(51) Int. Cl.
*H02J 1/00* (2006.01)
*H02M 3/155* (2006.01)
*H02J 7/35* (2006.01)

(52) U.S. Cl.
CPC . *H02M 3/155* (2013.01); *H02J 7/35* (2013.01)

(58) Field of Classification Search
CPC ..................................................... H20M 3/155
USPC ............................................................. 307/77
See application file for complete search history.

(56) References Cited

U.S. PATENT DOCUMENTS

| | | | |
|---|---|---|---|
| 4,788,452 A | 11/1988 | Stanley | |
| 5,914,588 A | 6/1999 | Jiang | |
| 2005/0270816 A1 * | 12/2005 | Nielsen | 363/142 |
| 2009/0206666 A1 * | 8/2009 | Sella et al. | 307/43 |
| 2011/0031816 A1 * | 2/2011 | Buthker et al. | 307/82 |
| 2011/0188276 A1 | 8/2011 | Schill | |
| 2012/0223584 A1 * | 9/2012 | Ledenev | 307/82 |

FOREIGN PATENT DOCUMENTS

| | | |
|---|---|---|
| DE | 4224795 A1 | 2/1993 |
| DE | 10 2008 050 402 A1 | 4/2010 |
| DE | 10 2010 006 124 A1 | 8/2011 |

* cited by examiner

*Primary Examiner* — Rexford Barnie
*Assistant Examiner* — Toan Vu
(74) *Attorney, Agent, or Firm* — Laurence A. Greenberg; Werner H. Stemer; Ralph E. Locher

(57) ABSTRACT

A boost converter with a multiple input and with improved efficiency has two or more inputs. A DC voltage source can be connected to each input. A common output carries a DC voltage whose value is greater than or equal to that of the input voltages. The common output is in each case connected to each of the plurality of inputs via a positive lead branch and a negative lead branch. At least one inductor is arranged in the positive lead branch and/or the negative lead branch from each input, and at least one rectification element is arranged in the positive lead branch and/or the negative lead branch from each input. Furthermore, the inputs can be connected in series by means of two or more switching elements via the inductors, wherein at least two of the inductors can in each case be connected in parallel.

9 Claims, 3 Drawing Sheets

BOOST CONVERTER WITH MULTIPLE INPUTS AND INVERTER CIRCUIT

CROSS-REFERENCE TO RELATED APPLICATION

This application claims the priority, under 35 U.S.C. §119, of German patent applications Nos. DE 10 2010 050 624.9, filed Nov. 5, 2010, and DE 10 2011 011 329.0-32, filed Feb. 16, 2011; the prior applications are herewith incorporated by reference in their entirety.

BACKGROUND OF THE INVENTION

Field of the Invention

The present invention relates to a boost converter, in particular a boost converter with multiple inputs, and to an inverter circuit having such a boost converter.

Boost converters, which are also referred to as step-up converters, are very frequently used in widely differing types of electrical power supplies. As in all power-electronic assemblies, one aim in this case is to achieve as high an efficiency as possible with costs which are as low as possible.

In order to produce an AC voltage, an inverter generally requires an intermediate-circuit voltage at a specific level. Optimum efficiency is normally achieved when the intermediate-circuit voltage is matched precisely to the AC voltage to be produced.

In general, depending on the light incidence, the temperature and the number of connected modules, solar generators produce a widely fluctuating DC voltage. The broader the range of the input DC voltage which an inverter can process, the more options there are for appropriate module combinations. For example, an input voltage range of 1:2 is desirable for full load, and a range of 1:2.5 is desirable for full load to no load.

A boost converter is therefore frequently used to match the solar generator to the inverter, boosting the variable DC voltage to a relatively constant intermediate-circuit voltage.

FIG. 1 shows the basic form of a conventional boost converter. The boost converter has an input and an output. A feeding source 10 supplies a DC voltage which can be tapped off as an input voltage at the input of the boost converter. This input voltage is boosted to a higher output voltage by the boost converter (which consists in particular of an inductor 12, a switching element 14 and a diode 16), and this higher output voltage is produced at the output 24 of the boost converter. The capacitors 20 and 22, which are connected in parallel with the input and output, respectively, of the boost converter, are used to buffer the ripple currents.

The switching element 14 is switched on and off periodically. The duty ratio is selected via control electronics so as to achieve a desired output voltage or a desired output current. When the switching element 14 is closed, current flows from the source 10 through the inductor 12, with energy being temporarily stored in the inductor 12. When the switching element 14 is open, the current flows from the source 10 via the freewheeling diode 16 and the inductor 12 to the load, with the energy which was previously stored in the inductor 12 being emitted to the load.

This conventional circuit arrangement has a number of disadvantages:
High ripple currents occur at the input and output.
A large inductor is required, since large amounts of energy must be temporarily stored.
The load on the semiconductors is high.
The efficiency is poor.

Overall, the use of a boost converter is associated with additional costs, weight and volume. Furthermore, the overall efficiency of the inverter circuit is decreased by the additional losses in the boost converter.

By way of example, DE 10 2008 050 402 A1 discloses a boost converter with a multiple input, as is illustrated in FIG. 2.

This conventional boost converter is fed from two DC voltage sources 10a and 10b at the same time. The two sources 10a, 10b are connected via a common boost converter such that they are connected in series when the switching element 14 is closed, and are connected in parallel to the output 24 via the freewheeling diodes 16a, 16b when the switching element 14 is open.

If the voltage from the DC voltage sources 10a, 10b is approximately 50% or 100% of the voltage of the output 24, then a steady-state series or parallel connection is sufficient to supply the load or loads which is or are connected to the output 24. If, in contrast, the voltage from the sources is between 50% and 100% of the output voltage, then the switching element 14 is operated in a clocked manner. In this case, the duty ratio is chosen such that the desired voltages and currents occur at the inputs and at the output.

In contrast to the conventional boost converter shown in FIG. 1, in this conventional embodiment of a boost converter, energy flows from the DC voltage sources 10a, 10b to the output 24 and to the load both when the switching element 14 is open and when it is closed. This results in a number of advantages over the circuit arrangement shown in FIG. 1.

The energy which must be temporarily stored in the inductors 12a, 12b, and the circulating reactive power, are considerably less. In consequence, the physical size of the inductors 12a, 12b and their losses are also considerably reduced. In addition, the load on the semiconductor components 14, 16a, 16b and the losses which occur in them are considerably less.

FIG. 3 shows a further conventional boost converter, as is described by way of example in German patent application DE 10 2010 006 124.7, which was published subsequently to the claimed priority date of the instant specification.

The conventional boost converter shown in FIG. 3 operates essentially in the same way as the boost converter illustrated in FIG. 2. However, it has two series-connected switching elements 14a, 14b which are connected to a potential which is approximately in the center between the potentials of the output and, for example, can be provided by a capacitor half-bridge 22a, 22b.

The advantage of this conventional circuit arrangement is that the voltage across the switching elements 14a, 14b is only half as great as the output voltage. Furthermore, both switching elements are clocked asynchronously.

This results in a problem with the conventional circuit arrangements shown in FIGS. 2 and 3. When the source voltage is low and the sources 10a, 10b are connected in series in the steady state, the current in the inductors 12a, 12b is twice as great as when the source voltage is high and they are connected in parallel in the steady state. Assuming a constant maximum power of the DC voltage sources, as is the case for example when using a boost converter in solar inverter circuits, then the current from the sources becomes greater the lower their voltage is. Each of the inductors 12a, 12b has to be designed for the maximum current that occurs. Since the physical volume of inductors increases with the square of the current, the inductors 12a, 12b which are required are relatively large, although they are considerably smaller than in the case of the conventional boost converter shown in FIG. 1.

SUMMARY OF THE INVENTION

It is accordingly an object of the invention to provide a boost converter and an inverter which overcome the above-mentioned disadvantages of the heretofore-known devices and methods of this general type and which provides for an improved boost converter with a multiple input, having increased efficiency.

With the foregoing and other objects in view there is provided, in accordance with the invention, a boost converter, comprising:

a plurality of inputs each for connection to a DC voltage source for supplying an input voltage; and a common output configured to carry a DC voltage having a value that is greater than or equal to a value of the input voltages, wherein a positive lead branch and a negative lead branch connecting said common output to each of said plurality of inputs;

at least one inductor connected in one or both of said positive lead branch and said negative lead branch from each said input;

at least one rectification element connected in one or both of said positive lead branch and said negative lead branch from each said input; and two or more switching elements for connecting said inputs in series via said inductors, wherein at least two of said inductors can in each case be connected in parallel.

The boost converter according to the invention, which may also be referred to as a step-up converter, has two or more inputs to each of which a DC voltage source can be connected, and a common output at which a DC voltage can be produced, whose value is greater than or equal to that of the input voltages. The common output is in each case connected to each of the plurality of inputs via a positive lead branch (i.e., positive supply line) and a negative lead branch (i.e., negative supply line), wherein at least one inductor is arranged in the positive supply line and/or the negative supply line from each input, and at least one rectification element is arranged in the positive supply line and/or the negative supply line from each input. Furthermore, the boost converter according to the invention is characterized in that the inputs can be connected in series by means of two or more switching elements via the inductors, wherein at least two of the inductors can in each case be connected in parallel.

On the basis of the conventional boost converters shown in FIG. 2 or 3, the circuit structure of the boost converter according to the invention has been modified such that, when the inputs of the boost converter are connected in series, at least two inductors can in each case be connected in parallel via switching elements. This allows the current to be shared between the inductors.

By way of example in the case of a boost converter according to the invention having two inputs, this means that, when the inputs are connected in series in the steady state, the inductor current can be halved, and is therefore of the same magnitude as that in the case of parallel connection in the steady state. It can be shown that the inductor current is not significantly greater even during clocked operation. This results in various advantages.

The required inductors are considerably smaller because the maximum current flowing in them is considerably reduced in comparison to the prior art shown in FIG. 1, 2 or 3.

Furthermore, the losses in the inductors are reduced. In addition, the current load on the semiconductor components is considerably reduced.

In order to obtain a wider input voltage range, the boost converter according to the invention is generalized for operation with two or more sources. When n sources are connected in series in the steady state, this then results in n-times the output voltage in comparison to parallel connection in the steady state.

The switching elements in the boost converter according to the invention are preferably semiconductor switches. These semiconductor switches are preferably clocked, or can be operated in the steady state.

The switching elements in the boost converter according to the invention can preferably be clocked at a fixed or variable frequency.

The switching elements in the boost converter according to the invention can preferably be clocked synchronously or asynchronously with respect to one another.

Furthermore, control electronics are preferably provided, which regulate the current and/or the voltage at the inputs and/or at the output of the boost converter by varying the clocking of the switching elements.

Freewheeling diodes, connected back-to-back in parallel, are preferably connected in parallel with the switching elements of the boost converter according to the invention.

Furthermore, measures or means are preferably provided for zero-current and/or zero-voltage switching of the switching elements.

The rectification elements in the boost converter according to the invention are preferably in the form of semiconductor diodes or synchronous rectifiers.

Furthermore, buffer capacitors are preferably connected in parallel with the inputs and/or the output of the boost converter.

The inductors in the boost converter can selectively be separate, partially separate and partially coupled to one another, or completely coupled to one another.

Furthermore, protective measures are preferably provided in order to prevent the plurality of inputs of the boost converter being connected in series in the event of a fault.

In one preferred embodiment of the invention, the positive pole of each input with the exception of the first is connected via an inductor and a switching element to the negative pole of the previous input, and a rectification element is connected between a connection point of the inductor to the switching element and the positive pole of the output, and the negative pole of each input with the exception of the last is connected via an inductor and a switching element to the positive pole of the next input, and a rectification element is connected between a connection point of the inductor to the switching element and the negative pole of the output.

In another preferred embodiment of the invention, the positive pole of each input with the exception of the first is connected via an inductor and a switching element to the negative pole of the previous input, and a rectification element is connected between a connection point of the inductor to the switching element and the positive pole of the previous input, and the negative pole of each input with the exception of the last is connected via an inductor and a switching element to the positive pole of the next input, and a rectification element is connected between a connection point of the inductor to the switching element and the negative pole of the next input.

In one advantageous refinement of the invention, the positive pole of the first input is connected to the positive pole of the output, and the negative pole of the last input is connected to the negative pole of the output.

In a further advantageous refinement of the invention, those of the inductors which can be connected in parallel can be connected in series by means of at least one further switching element and preferably also at least one further rectification element. When the plurality of inputs of the boost converter are connected in series in a clocked manner, this allows the inductors which can be connected in parallel to be connected in series, while the other switching elements are inactive, in order in this way to achieve even higher efficiency.

In a further advantageous refinement of the invention, additional switching elements are provided between the positive and negative lead branches of the inputs, in order to allow the plurality of inputs to be connected in series or in parallel in the steady state.

Finally, two or more such boost converters according to the invention can also be operated in parallel or in series. In this case, the boost converters which are operated in parallel preferably operate in the multiphase mode, in which case further, preferably individual, boost converters can be switched off in order to increase the efficiency on partial load.

The boost converter according to the invention can advantageously be used in an inverter circuit, in particular a solar inverter circuit, having at least one inverter for conversion of the output voltage which is produced by the boost converter at its output to an AC voltage, in order in this way to increase the efficiency of the entire inverter circuit. The inverter can be coupled in the normal manner to a network (power supply network, stand-alone network) or to a load.

Furthermore, in one advantageous refinement, a device is provided for carrying out maximum-power-point tracking of the DC voltage sources which are connected to the inputs of the boost converter or converters.

In a further advantageous refinement, the output voltage of the at least one boost converter can be dynamically regulated such that the at least one inverter operates in its optimum operating state.

Other features which are considered as characteristic for the invention are set forth in the appended claims.

Although the invention is illustrated and described herein as embodied in a boost converter with multiple input, it is nevertheless not intended to be limited to the details shown, since various modifications and structural changes may be made therein without departing from the spirit of the invention and within the scope and range of equivalents of the claims. Specifically, the described exemplary embodiments can each be implemented in their own right, or in many cases also in combination with one another.

In combinations such as these, it is feasible to change between different variants depending on the operating state, for example depending on the level of the input voltage or output voltage of the boost converter, for example by switching the switching elements in the relevant variant to be active or inactive. By way of example, this in each case makes it possible to select the variant or the operating mode which has the best efficiency when subject to the given constraints.

The construction and method of operation of the invention, together with additional objects and advantages thereof will be best understood from the following description of specific embodiments when read in connection with the accompanying drawings.

DETAILED DESCRIPTION OF THE INVENTION

Figure 4:
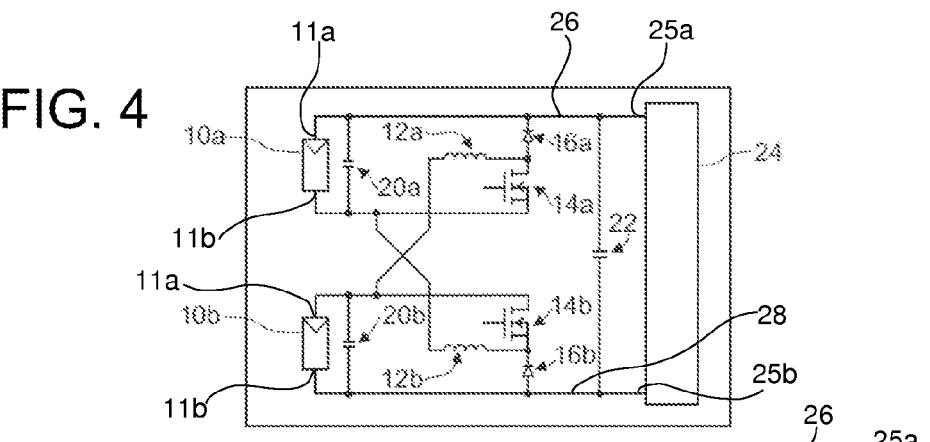
FIG. 4 shows a schematic block diagram of a first exemplary embodiment of a boost converter according to the invention.

Referring now once more to the figures of the drawing in detail, FIG. 4 shows a first embodiment of a boost converter according to the invention.

This boost converter, which may also be referred to as a step-up converter, operates as follows. The feeding sources 10a, 10b each supply a DC voltage to the positive pole 11a and the negative pole 11b of a respective input. Widely differing direct-current sources may be used as sources, such as solar generators, fuel cells, thermoelectric generators, rechargeable batteries, batteries, supercapacitors, electromagnetic generators, AC/DC converters, DC/DC converters and the like.

The DC voltage from the sources 10a, 10b is boosted to a higher output voltage by the common boost converter, which is formed primarily from two inductors 12a, 12b, two switching elements 14a, 14b and two diodes (rectification elements according to the invention) 16a, 16b. Both sources 10a, 10b are preferably operated at the same voltage and with the same current, that is to say balanced. By way of example, MOSFETs or IGBTs may be used as switching elements 14a, 14b. These may have freewheeling diodes connected back-to-back in parallel with them. The two inductors 12a and 12b may be optionally coupled or separate.

The freewheeling diodes 16a, 16b may be replaced by active switching elements (synchronous rectifiers), in order to increase the efficiency. In addition, in order to reduce the switching losses, ring-around networks and the like can be installed, which allow the switching elements 14a, 14b to switch at the current and/or voltage zero crossing. The input-side capacitors 20a, 20b and the output-side capacitor 22 are used for buffering.

A load may be connected to the positive pole 25a and the negative pole 25b of the output 24. Assemblies which pass on the energy, for example inverters or battery chargers, can also be used as loads.

The DC voltage sources 10a, 10b are connected to the boost converter such that they are connected in series via the inductors 12a, 12b when the switching elements 14a, 14b are closed, and are connected to the output 24 in parallel via the diodes 16a, 16b and the inductors 12a, 12b when the switching elements 14a, 14b are open. A positive lead branch 26 connects the positive pole 25a of the common output to the positive poles 11a of each of the plurality of inputs, and a negative lead branch 28 connects the negative pole 25b of the common output to the negative poles 11b of each of the plurality of inputs.

When the voltage of the sources 10a, 10b is 100% of the output voltage, then it is sufficient for the DC voltage sources 10a, 10b to be connected in parallel in the steady state, in order to produce the output voltage. No switching losses whatsoever then occur. In contrast, when the voltage from the sources 10a, 10b is 50% of the output voltage, then it is sufficient for the sources 10a, 10b to be connected in series in the steady state, in order to produce the output voltage. No switching losses whatsoever are produced in this case either.

When the voltage from the sources 10a, 10b is between 50% and 100% of the output voltage, then the switching elements 14a, 14b are operated in a clocked manner. The duty ratio is regulated via control electronics (not illustrated) such that the desired voltage or the desired current is produced at the output 24. Control electronics such as these are prior art, and are assumed to be known. It is also possible to regulate the voltage or current at the inputs. By way of example, this is frequently done when solar generators are used as sources, which should be operated at the point of maximum power. The duty ratio varies between 100% (steady-state series connection) and 0% (steady-state parallel connection). Different duty ratios at the switching elements 14a and 14b make it possible to load the sources in an unbalanced form.

Both switching elements 14a, 14b can be operated synchronously or asynchronously. The switching elements 14a, 14b may be operated at a fixed or variable frequency. If the voltage from the sources 10a, 10b is in the vicinity of 50% or 100% of the output voltage then, for example, the frequency can be reduced, in order to reduce the switching losses.

Figure 5:
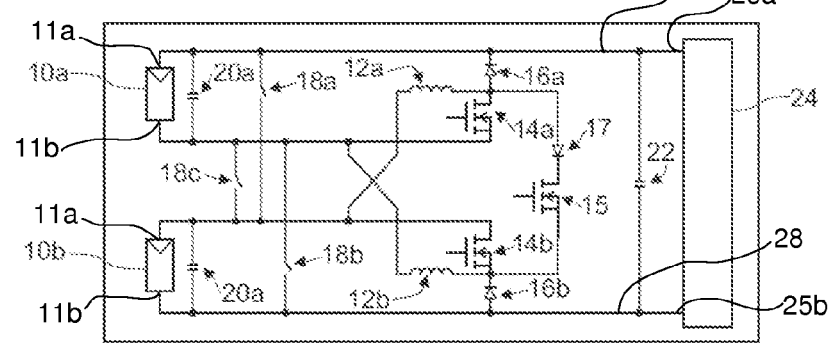
FIG. 5 shows a schematic block diagram of a second exemplary embodiment of a boost converter according to the invention, equipped with additional components for steady-state and dynamic bridging of components which are present.

FIG. 5 shows, as a second exemplary embodiment of a boost converter according to the invention, options for bridging components, in order to further increase the efficiency:

During steady-state operation (parallel or series connection of the sources 10a, 10b), components can be bridged or the sources 10a, 10b can be connected directly to the output 24, in order to increase the efficiency. This can be done, for example, with the aid of the elements 18a-18c. By way of example, these may be relays or semiconductor switches. It is also possible to use a diode for the element 18c, preferably using a slow diode with a very low voltage forward-biased.

During clocked operation, it is also possible to increase the efficiency by bridging components. In the case of high source voltages, a voltage shift which virtually corresponds to the output voltage occurs across each of the switching elements 14a, 14b. In the case of the conventional circuits shown in FIG. 2 or 3, this voltage shift occurs only once across the common switching element 14 or the combination of the switching elements 14a, 14b. Since the inductor currents are in this case approximately the same for the boost converter shown in FIG. 2 or 3 and for the boost converter according to the invention, the switching losses in the boost converter according to the invention are virtually twice as great.

Figure 2:
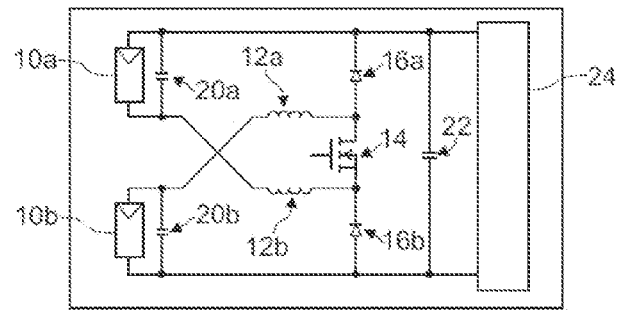
FIG. 2 shows a schematic block diagram of a conventional boost converter with multiple inputs according to the prior art.
Figure 3:
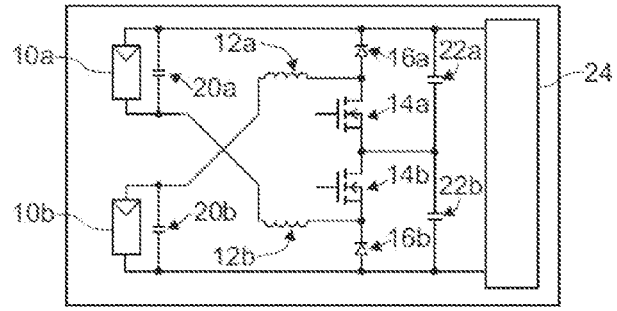
FIG. 3 shows a schematic block diagram of a conventional boost converter with multiple inputs and with a mid-point potential according to the prior art.

In order to achieve optimum efficiency at both low and high input voltages, it may be worthwhile combining the boost converter according to the invention with the conventional circuit arrangements shown in FIG. 2 or 3 and, when the input voltage is high, switching to the operating mode of these circuits as shown in FIG. 2 or 3, since they then have the higher efficiency.

For this purpose, for example analogously to the circuit arrangement shown in FIG. 2, an additional switching element 15 is inserted, which can connect the inductors 12a, 12b in series. In order to avoid reverse currents when the switching elements 14a, 14b are switched on, a diode (additional rectification element) 17 is additionally fitted. When the input voltages are low, the switching elements 14a, 14b are clocked, while the additional switching element 15 is inactive. In contrast, when the input voltages are high, the additional switching element 15 is clocked, while the switching elements 14a and 14b are inactive.

Analogously to the conventional circuit arrangement shown in FIG. 3, two additional switching elements may also be fitted, together with the respectively associated reverse-biased diodes, with one connection being used to form a mid-point potential.

Widening of the Relative Input Voltage Range:

The relative input voltage range which, in the first embodiment of the invention (FIG. 4), is 1:2 or 50% . . . 100% of the output voltage, can be increased by increasing the number of sources. For this purpose, the circuit is extended such that all the sources, as in the case of the circuit shown in FIG. 4, can be connected both in parallel and in series to the output, in which case inductors can once again be connected in parallel when connected in series.

Figure 6:
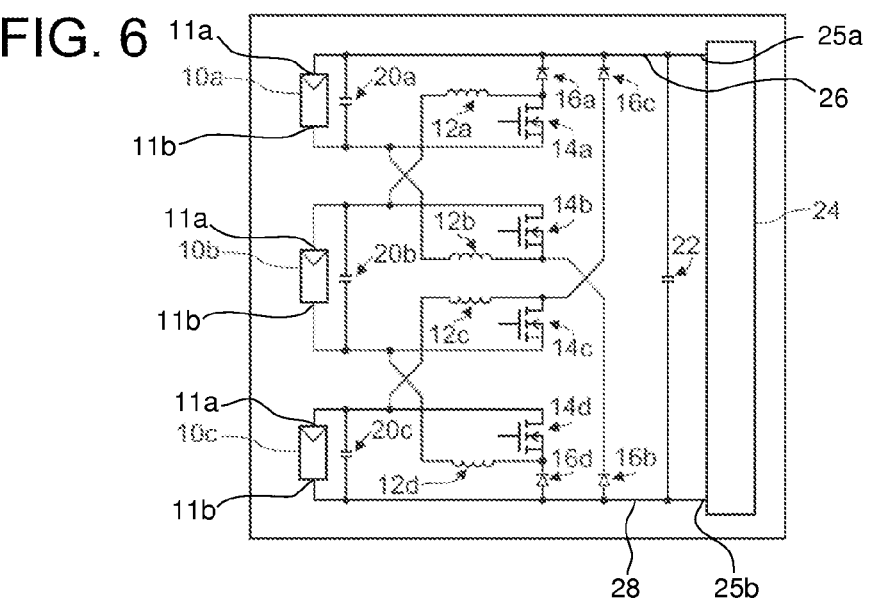
FIG. 6 shows a schematic block diagram of a third exemplary embodiment of a boost converter according to the invention with three inputs.

By way of example, FIG. 6 shows a first variant of a boost converter according to the invention with three inputs, as a third exemplary embodiment.

All three sources 10a-10c are preferably operated balanced. The three sources 10a-10c can be connected in series via the inductors 12a-12d by switching on the switching elements 14a-14d. In contrast, when the switching elements 14a-14d are switched off, the three sources 10a-10c can be connected in parallel to the output via the diodes 16a-16d and the inductors 12a-12d.

If the voltage from the sources 10a-10c is in each case 100% of the output voltage, then it is sufficient for the three sources 10a-10c to be connected in parallel in the steady state, in order to produce the output voltage. If the voltage from the sources 10a-10c is in each case approximately 33% of the output voltage, then it is sufficient to connect the three sources 10a-10c in series in the steady state, in order to produce the output voltage.

If the voltage from the sources 10a-10c is between 33% and 100% of the output voltage, then the switching elements 14a-14d are operated in a clocked manner.

The switching elements 14a and 14d can be operated synchronously, as can the switching elements 14b and 14c. Asynchronous operation is likewise possible. The inductors 12a and 12d can be coupled, as can the inductors 12b and 12c.

If the aim is to load the sources 10a-10c uniformly, it is necessary to choose the duty ratio for the switching elements 14b and 14c to be somewhat higher than that of the switching elements 14a and 14d. This can be achieved, for example, via control electronics, which regulate the balance between the source voltages, in addition to the currents and voltages at the inputs and/or at the output of the boost converter.

This circuit variant results in a wider input voltage range of 1:3 or 33% . . . 100% of the output voltage, which may be advantageous for sources whose voltage varies widely.

According to this schematic layout illustrated in FIG. 6, the circuit arrangement may also have n voltage sources 10a . . . 10n added, thus making it possible to increase the relative input voltage range to 1:n.

Figure 7:
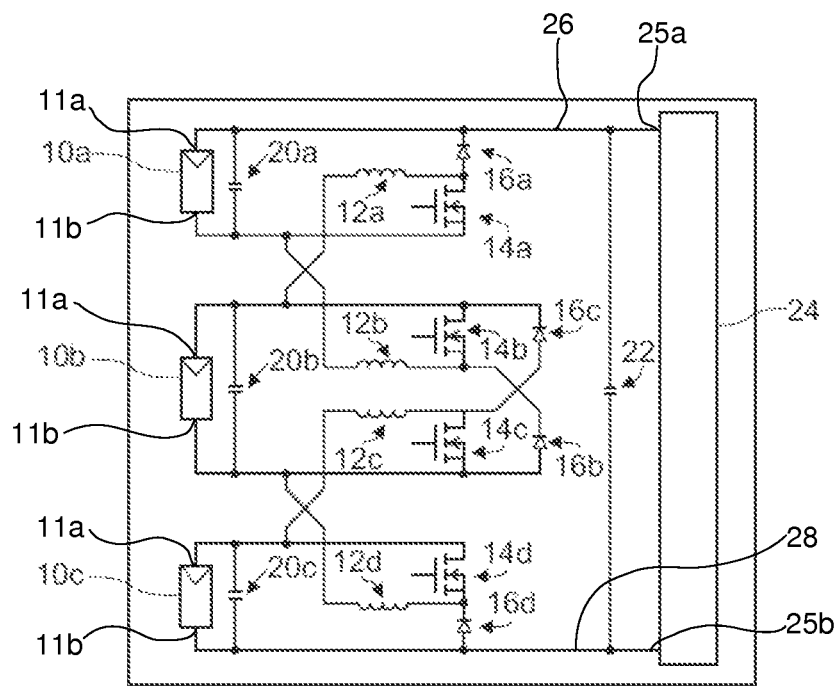
FIG. 7 shows a schematic block diagram of a fourth exemplary embodiment of a boost converter according to the invention with three inputs.

By way of example, FIG. 7 shows a second variant of a boost converter according to the invention, with three inputs, as a fourth exemplary embodiment.

In this case, the diodes 16b and 16c are connected to the DC voltage source 10b, instead of to the output of the boost converter. In this variant, all the inductors 12a-12d may be coupled, and the switching elements 14a-14d may be operated synchronously. Asynchronous operation is also possible.

Parallel Connection, Series Connection

Two or more boost converters according to the invention may also be connected in parallel. In this case, the individual boost converters can be operated with a phase offset, in order to reduce the ripple currents at the inputs and at the output (multiphase operation). Furthermore, when on partial load, individual boost converters may be entirely switched off, in order to increase the partial load efficiency.

Two or more boost converters according to the invention can also likewise be connected in series.

Protective Measures

When the source voltage is high, it is possible, for example in the event of a defect in one or more of the switching elements 14a-14d, for the DC voltage sources 10a-10c to be inadvertently connected in series, thus resulting in an impermissibly high voltage at the output 24.

Protective apparatuses may be installed in order to prevent this, which interrupt or short current paths in the event of a fault. There are many possible ways to do this, such as Shorting the sources (particularly in the case of sources with a low short-circuit current, such as solar generators). By way of example, thyristor circuits ("crowbar" circuit) are suitable for this purpose, possibly in conjunction with fuses.

Disconnection of the sources by means of semiconductors or relays.

Because relays have low losses when they are switched on, they are more suitable than semiconductors. However, they switch slowly and arcs may be formed at the contacts. In order to counteract this, it is possible to combine relays with semiconductors. For example, relays and semiconductors can be connected in parallel. The relay opens first, while the semiconductor is still switched on; the semiconductor then opens. This prevents arcs on the relay contact.

It is also feasible to short the source by means of a semiconductor, then to disconnect the source by means of a relay, and finally to open the semiconductor again, in order to prevent a continuous load on the source.

The protective measures may also be implemented elsewhere in the circuit arrangement directly at the DC voltage sources.

Use in Inverters

The boost converter can be used not only for directly feeding direct-current loads or direct-current networks, but also for feeding DC voltage intermediate circuits in other appliances, such as inverters.

In order to produce an AC voltage, an inverter generally needs an intermediate-circuit voltage at a specific level. Optimum efficiency is achieved when the intermediate-circuit voltage is precisely matched to the AC voltage to be produced.

Inverters are frequently used for a solar power supply. Depending on the light incidence, the temperature and the number of connected modules, solar generators produce a widely fluctuating DC voltage. The broader the input DC voltage range which an inverter can process, the more options the installer has to find appropriate solar module combinations. An input voltage range of 1:2 on full load (or 1:2.5 from full load to no load) is desirable.

A boost converter is therefore often used for matching the solar generator to the inverter. This can boost the varying DC voltage from the solar generator to an approximately constant intermediate-circuit voltage. It is also possible to modulate the intermediate-circuit voltage with a superimposed alternating component, which may be advantageous for optimum matching of the inverter. Unfortunately, additional losses occur in the boost converter, which reduce the overall efficiency of the inverter.

In comparison to the prior art, the boost converter according to the invention has higher efficiency with reduced volume, weight and costs at the same time.

Although, in the case of the boost converter according to the invention, the inputs can be selectively connected in series or in parallel, the potentials at the inputs can be kept constant with respect to the output. This is important because the potential of a solar generator should not have any sudden high-frequency changes, for electromagnetic compatibility reasons.

The boost converter according to the invention can be used to carry out maximum-power-point tracking of the solar generators. When the voltage from the solar generators is very high, or is higher than required for operation of the inverter, the boost converter can be switched to steady-state parallel operation. The voltage from the solar generators is then passed on directly to the inverter. In this case, the inverter can carry out the tracking.

Various inverter topologies may be used in conjunction with the boost converter. Both single-phase and polyphase inverters may be used. Inverters may be used to feed stand-alone networks, or to feed a mains network.

Figure 1:
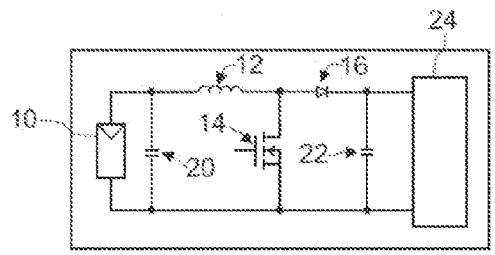
FIG. 1 shows a schematic block diagram explaining one basic form of a conventional boost converter according to the prior art.
Figure 8:
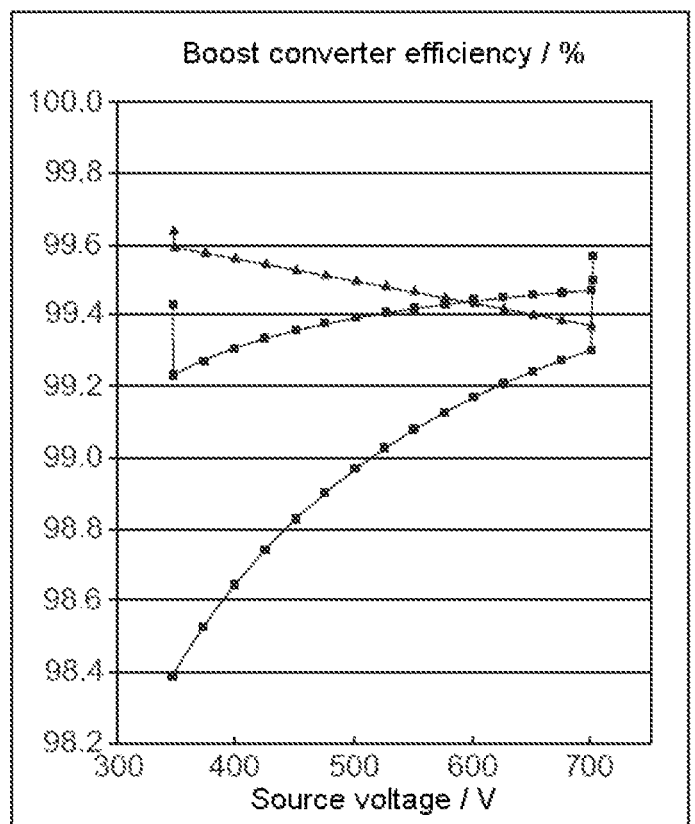
FIG. 8 shows a diagram to illustrate the improved efficiency of the boost converter according to the invention, in comparison to the prior art.

FIG. 8 shows the calculated efficiency profile of the boost converter according to the invention, as shown in FIG. 4, as a function of the source voltage (upper curve with triangular markers). The middle curve with square markers shows the efficiency of the conventional circuit arrangements as shown in FIGS. 2 and 3. The lower curve shows the efficiency of the conventional circuit arrangement as shown in FIG. 1.

At a source voltage of 700 V, none of the boost converters are clocked, as a result of which there are no switching losses and the efficiency is correspondingly increased. In the case of the boost converter according to the invention and the conventional circuits as shown in FIGS. 2 and 3, this is also possible for a source voltage of 350 V, by connecting the two sources in series in the steady state.

The invention claimed is:

1. A boost converter, comprising:
   a plurality of inputs each having a positive pole and a negative pole for connection to a DC voltage source for supplying an input voltage; and
   a common output configured to carry a DC voltage having a value that is greater than or equal to a value of the input voltages, and having a positive pole and a negative pole, wherein
   a positive lead branch connects said positive pole of said common output to said positive poles of each of said plurality of inputs, and a negative lead branch connects said negative pole of said common output to said negative poles of each of said plurality of inputs;
   at least one inductor is connected in one or both of said positive lead branch and said negative lead branch from each of said plurality of inputs;
   at least one rectification element is connected in one or both of said positive lead branch and said negative lead branch from of said plurality of inputs; and
   two or more switching elements are provided for connecting said inputs in series via said inductors, wherein at least two of said inductors can in each case be connected in parallel when said inputs are connected in series.

2. The boost converter according to claim 1, wherein:
   a positive pole of each input, except for a first said input, is connected via an inductor and a switching element to a negative pole of a respectively previous input, and a rectification element is connected between a node between said inductor and said switching element and a positive pole of said output; and a negative pole of each input, except for a last said input, is connected via an inductor and a switching element to a positive pole of a respectively following input, and a rectification element is connected between a node between said inductor and said switching element and a negative pole of said output.

3. The boost converter according to claim 1, wherein:

a positive pole of each input, except for a first said input, is connected via an inductor and a switching element to a negative pole of a respectively previous input, and a rectification element is connected between a node between said inductor and said switching element and the positive pole of the respectively previous input; and a negative pole of each input, except for a last said input, is connected via an inductor and a switching element to a positive pole of a respectively following input, and a rectification element is connected between a node between said inductor and said switching element and a negative pole of a respectively following input.

4. The boost converter according to claim 1, which comprises at least one further switching element configured to connect in series those inductors that can be connected in parallel.

5. The boost converter according to claim 1, which comprises additional switching elements connected between the positive and negative lines of said inputs, enabling said plurality of inputs to be connected in series or in parallel in a steady state.

6. An inverter circuit, comprising:
   at least one boost converter according to claim 1; and
   at least one inverter connected to said boost converter for conversion of the output voltage or voltages produced by said boost converter to an AC voltage.

7. The inverter circuit according to claim 6 configured as a solar generator inverter circuit.

8. The inverter circuit according to claim 6, which comprises a device for carrying out maximum-power-point tracking of the DC voltage sources connected to said inputs of said at least one boost converter.

9. The inverter circuit according to claim 6, wherein an output voltage of said at least one boost converter can be dynamically closed-loop controlled such that said at least one inverter operates in an optimum operating state thereof.

* * * * *